(12) United States Patent
Koga et al.

(10) Patent No.: US 10,994,681 B2
(45) Date of Patent: May 4, 2021

(54) BUMPER BEAM AND VEHICLE

(71) Applicant: NIPPON STEEL CORPORATION, Tokyo (JP)

(72) Inventors: Atsuo Koga, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/636,890

(22) PCT Filed: Aug. 15, 2017

(86) PCT No.: PCT/JP2017/029412
§ 371 (c)(1),
(2) Date: Feb. 5, 2020

(87) PCT Pub. No.: WO2019/035185
PCT Pub. Date: Feb. 21, 2019

(65) Prior Publication Data
US 2020/0164819 A1 May 28, 2020

(51) Int. Cl.
*B60R 19/04* (2006.01)
*B60R 19/03* (2006.01)

(52) U.S. Cl.
CPC .............. *B60R 19/04* (2013.01); *B60R 19/03* (2013.01)

(58) Field of Classification Search
CPC ................................ B60R 19/04; B60R 19/03
See application file for complete search history.

(56) References Cited

U.S. PATENT DOCUMENTS 8,408,632 B2 * 4/2013 Shimotsu ................ B60R 19/18
296/102
2011/0127783 A1 6/2011 Shimotsu et al.
(Continued)

FOREIGN PATENT DOCUMENTS

JP 6-171441 A 6/1994
JP 6-328988 A 11/1994
(Continued)

OTHER PUBLICATIONS

International Search Report for PCT/JP2017/029412 (PCT/ISA/210) dated Sep. 12, 2017.
(Continued)

*Primary Examiner* — D Glenn Dayoan
*Assistant Examiner* — Melissa Ann Bonifazi
(74) *Attorney, Agent, or Firm* — Birch, Stewart, Kolasch & Birch, LLP

(57) ABSTRACT

A bumper beam for a vehicle that is lightweight and high in strength is provided. A bumper beam for a vehicle includes a first member and a second member. The first member includes a first top panel part, two first vertical wall parts, and two first flange parts. The second member includes a second top panel part, two second vertical wall parts, and two second flange parts. The second top panel part includes a protruding part that protrudes toward a side opposite to the first top panel part. The two second vertical wall parts are disposed such that the second vertical wall parts respectively face close the first vertical wall parts inside the first member. The two second flange parts are disposed such that the second flange parts are connected to the two second vertical wall parts and joined to the first flange parts, respectively.

18 Claims, 7 Drawing Sheets

(56) References Cited

U.S. PATENT DOCUMENTS

| | | |
|---|---|---|
| 2016/0009236 A1 | 1/2016 | Nilsson |
| 2018/0001853 A1 | 1/2018 | Koga et al. |
| 2018/0194310 A1 | 7/2018 | Koga et al. |

FOREIGN PATENT DOCUMENTS

| | | | |
|---|---|---|---|
| JP | 7-309184 | A | 11/1995 |
| JP | 2010-42753 | A | 2/2010 |
| JP | 2011-111074 | A | 6/2011 |
| JP | 2016-509976 | A | 4/2016 |
| KR | 10-2011-0088921 | A | 8/2011 |
| KR | 10-2016-0126736 | A | 11/2016 |
| WO | WO 2016/117335 | A1 | 7/2016 |
| WO | WO 2017/006925 | A1 | 1/2017 |

OTHER PUBLICATIONS

Written Opinion of the International Searching Authority for PCT/JP2017/029412 (PCT/ISA/237) dated Sep. 12, 2017.

\* cited by examiner

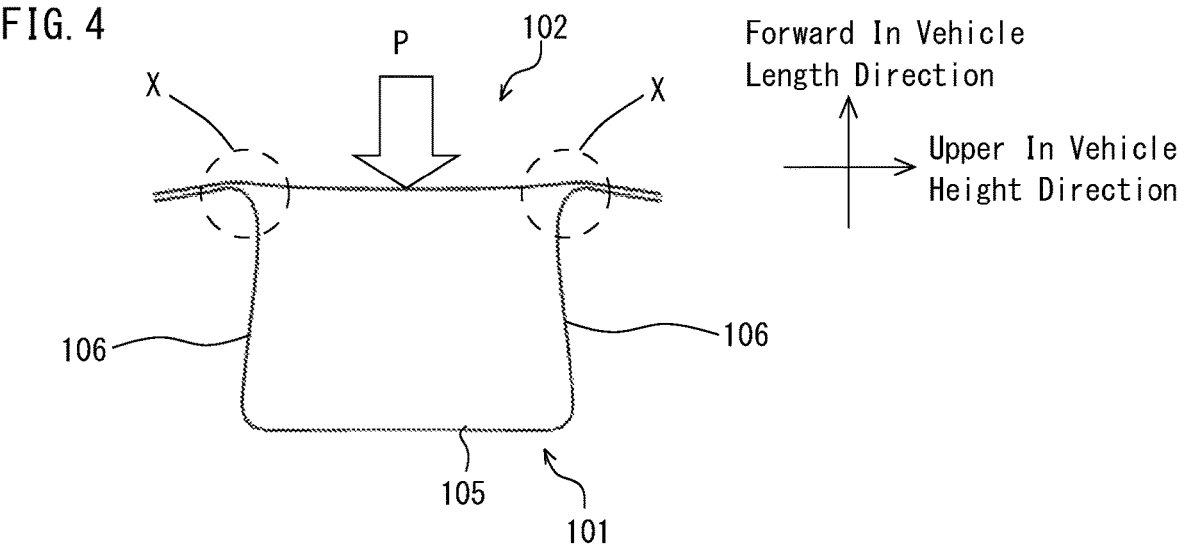
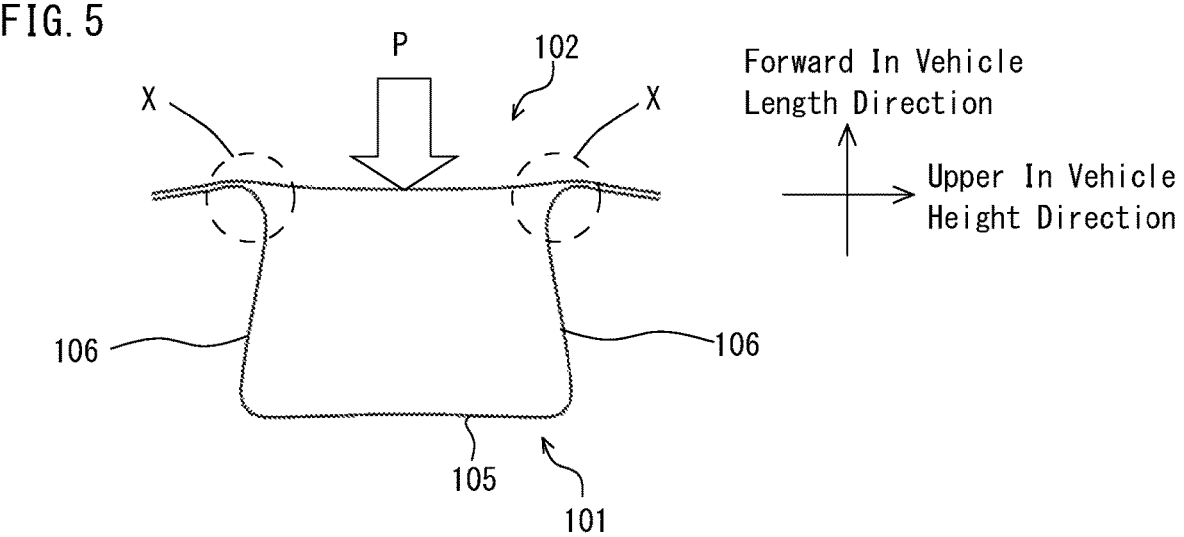
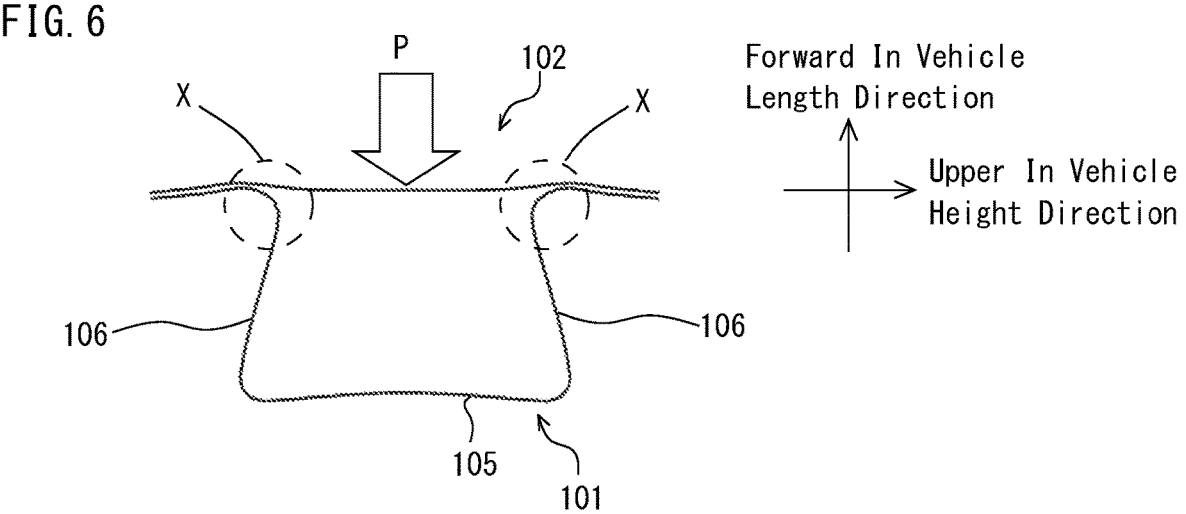

BUMPER BEAM AND VEHICLE

TECHNICAL FIELD

The present disclosure relates to a bumper beam for a vehicle and a vehicle equipped with the bumper beam. More specifically, the present disclosure relates to a bumper beam for an automobile and an automobile equipped with the bumper beam.

BACKGROUND ART

A bumper beam is provided inside a bumper of a vehicle. This is to ensure a safety of the vehicle by causing the bumper beam to bear a collision load at a time of collision. There has been a need for bumper beams that are lightweight from viewpoints of reducing. $CO_2$ and improving fuel efficiency. In order to achieve weight reduction of bumper beams, it is necessary to reduce plate thicknesses of the bumper beams while enhancing strengths of the bumper beams.

High-strength bumper beams are disclosed in, for example, Japanese Patent Application Publication No. 07-309184 (Patent Literature 1), Japanese Patent Application Publication No. 06-328988 (Patent Literature 2), Japanese Patent Application Publication No. 06-171441 (Patent Literature 3), and Japanese Patent Application Publication No. 2011-111074 (Patent Literature 4).

A bumper beam disclosed in Patent Literature 1 includes a reinforcing member that is disposed in a box-shaped space formed of a plurality of members joined together. The reinforcing member extends along a front-to-back direction of a vehicle. Patent Literature 1 describes that accordingly the strength of the bumper beam is as high as that of a conventional bumper beam, a weight reduction and a low cost can be achieved.

A bumper beam disclosed in Patent Literature 2 has a box-shaped cross section and includes a reinforcing member inside the box-shaped cross section. The reinforcing member extends along a vertical direction of a vehicle. An upper wall part and a lower wall part are therefore prevented from deforming outward when a load is imposed in a front-to-back direction of the vehicle. Patent Literature 2 describes that this enhances strength of the bumper beam.

A bumper beam disclosed in Patent Literature 3 includes a reinforcing member in an inner space having a box-shaped cross section made by combining hat-shaped press formed bodies. The reinforcing member extends along a vertical direction of a vehicle. Patent Literature 3 describes that this enhances strength of the bumper beam, and the bumper beam is prevented from deforming.

A bumper beam disclosed in Patent Literature 4 includes a front reinforcement member and a rear reinforcement member. The front reinforcement member includes a front groove that is depressed from a front face side toward a rear face side of the bumper beam. The rear reinforcement member includes a rear groove that is depressed from a front face side toward a rear face side of the bumper beam. The front groove is fitted to the rear groove. Patent Literature 4 describes that this improves an energy absorption property of the bumper beam.

CITATION LIST

Patent Literature

Patent Literature 1: Japanese Patent Application Publication No. 07-309184

Patent Literature 2: Japanese Patent Application Publication No. 06-328988

Patent Literature 3: Japanese Patent Application Publication No. 06-171441

Patent Literature 4: Japanese Patent Application Publication No. 2011-111074

SUMMARY OF INVENTION

Technical Problem

The bumper beams of Patent Literatures 1 to 3 include, however, the reinforcing members for ensuring safety of their vehicles. The bumper beams of Patent Literatures 1 to 3 are therefore heavy. The rear reinforcement member of the bumper beam of Patent Literature 4 includes the rear groove. The bumper beam of Patent Literature 4 is therefore heavy by weights of walls of the rear groove.

An objective of the present disclosure is to provide a bumper beam for a vehicle that is lightweight and high in strength.

Solution to Problem

A bumper beam for a vehicle according to an embodiment of the present invention includes a first member and a second member. The first member includes a first top panel part, two first vertical wall parts, and two first flange parts. The first top panel part is flat in a cross section perpendicular to a lengthwise direction of the first member. Each of the two first vertical wall parts is connected to a respective one of opposite sides of the first top panel part. Each of the two first flange parts is connected to a respective one of the two first vertical wall parts. The second member includes a second top panel part, two second vertical wall parts, and two second flange parts. The second top panel part includes a protruding part that protrudes toward a side opposite to the first top panel part. Each of the two second vertical wall parts is connected to a respective one of opposite sides of the second top panel part. The two second vertical wall parts are disposed such that each of the second vertical wall parts faces close a respective one of the first vertical wall parts inside the first member. The two second flange parts are disposed such that each of the second flange parts is connected to a respective one of the two second vertical wall parts and is joined to a respective one of the first flange parts.

Advantageous Effects of Invention

The bumper beam according to the present disclosure is lightweight and high in strength.

BRIEF DESCRIPTION OF DRAWINGS

FIG. 4 is a diagram illustrating deformation behaviors of the bumper beam in the case 1, where an initial state is illustrated.

FIG. 5 is a diagram illustrating a state where the deformation progresses from the state illustrated in FIG. 4.

FIG. 6 is a diagram illustrating a state where the deformation further progresses from the state illustrated in FIG. 5.

DESCRIPTION OF EMBODIMENTS

Figure 1:
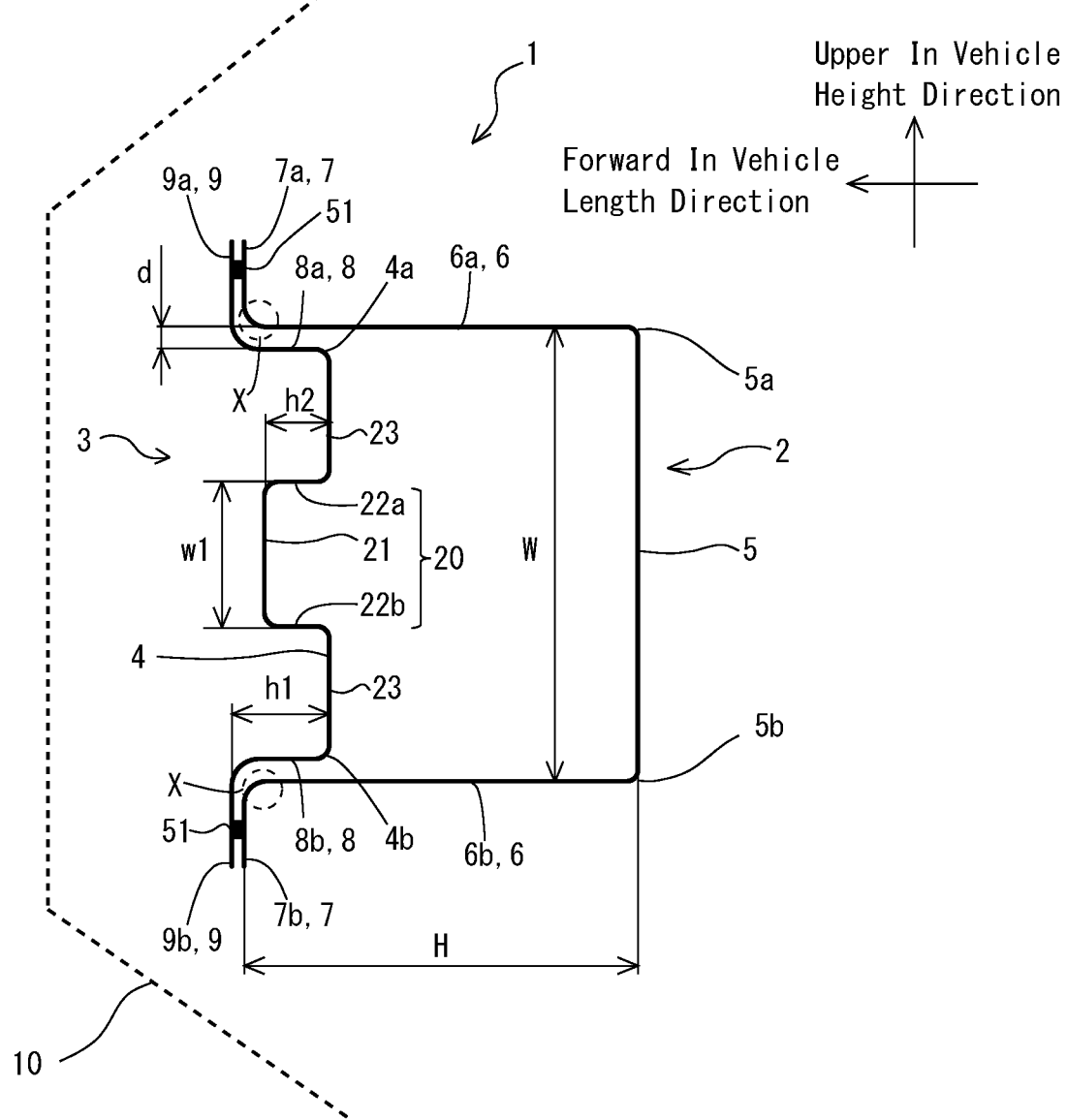
FIG. 1 is a cross-sectional view of a bumper beam according to the present embodiment.

A "lengthwise direction" of a member included in a bumper beam herein means a vehicle width direction in a state where the bumper beam is mounted on a front portion or a rear portion of a vehicle. A "length" of a member included in the bumper beam herein means a length of the member in question in the lengthwise direction. A "width" of a member included in the bumper beam herein means a length of the member in a vehicle height direction in a state where the bumper beam is mounted on a front portion or a rear portion of a vehicle. A "height" of a member included in the bumper beam herein means a length of the member in a vehicle length direction in a state where the bumper beam is mounted on a front portion or a rear portion of a vehicle.

A "maximum allowable load" herein means a maximum load that is put on a bumper beam when the bumper beam buckles.

(1) A bumper beam for a vehicle according to the present embodiment includes a first member and a second member. The first member includes a first top panel part, two first vertical wall parts, and two first flange parts. The first top panel part is flat in a cross section perpendicular to the lengthwise direction. Each of the two first vertical wall parts is connected to a respective one of opposite sides of the first top panel part. Each of the two first flange parts is connected to a respective one of the two first vertical wall parts. The second member includes a second top panel part, two second vertical wall parts, and two second flange parts. The second top panel part includes a protruding part that protrudes toward a side opposite to the first top panel part. Each of the two second vertical wall parts is connected to a respective one of opposite sides of the second top panel part. The two second vertical wall parts are disposed such that each of the second vertical wall parts faces close a respective one of the first vertical wall parts inside the first member. The two second flange parts are disposed such that each of the second flange parts is connected to a respective one of the two second vertical wall parts and is joined to a respective one of the first flange parts.

In the bumper beam according to the present embodiment, the second vertical wall parts of the second member are disposed such that the second vertical wall parts face the first vertical wall parts of the first member. In this case, when a collision load is imposed on the bumper beam, the second member prevents the first member from deforming. In addition, since the second top panel part includes the protruding part, areas of the second top panel part except the protruding part deforms to move toward the first vertical wall parts when the collision load is imposed on the bumper beam. As a result, the first vertical wall parts are prevented from deforming inward of the bumper beam. Accordingly, the strength of the bumper beam according to the present embodiment remains high without an additional reinforcing member. The bumper beam according to the present embodiment is therefore lightweight and high in strength.

(2) In the bumper beam according to the above (1), a ratio h1/H between a height h1 of the second vertical wall parts and a height H of the first vertical wall parts is preferably 0.1 or more to 0.5 or less.

(3) In the bumper beam according to the above (1) or (2), gaps between a respective one of the first vertical wall parts and a respective one of the second vertical wall parts are preferably 0 mm or more to 10 mm or less.

(4) In the bumper beam according to any one of the above (1) to (3), a ratio w1/W between a width w1 of the protruding part of the second top panel part and a width W of the first top panel part is preferably 0.1 or more to 0.7 or less, and a ratio h2/h1 between a height h2 of the protruding part of the second top panel part and the height h1 of the second vertical wall parts of the second member is preferably 0.5 or more to 1.1 or less.

(5) In the bumper beam according to any one of the above (1) to (4), a respective one of the first flange parts and a respective one of the second flange parts are preferably joined by welding, adhesion, rivets, or use thereof in combination.

(6) In the bumper beam according to any one of the above (1) to (5), the first member and the second member are made of steel plates, and the steel plates each have preferably a tensile strength of 1 GPa or more.

(7) The bumper beam according to any one of the above (1) to (6) further includes a plurality of joints, each of the plurality of joints is provided between a respective one of the first flange parts and a respective one of the second flange parts preferably in an area within 15 mm of an edge of a side of one of the respective first flange parts on first vertical wall parts. This is because the second member is more prone to undergo out-of-plane deformation as the joints are away from the first vertical wall parts, and an effect of preventing the first vertical wall parts from deformation deteriorates.

(8) In the bumper beam according to any one of the above (1) to (7), in the cross section perpendicular to the lengthwise direction, an entire of the first top panel part lies preferably on an opposite side of a line that connects midpoints of the first vertical wall parts from the second member.

(9) A vehicle, in which the bumper beam according to any one of the above (1) to (8) is disposed, includes the bumper beam according to any one of the above (1) to (8) in a front portion or a rear portion of the vehicle. In this case, the second member of the bumper beam is disposed such that the second member lies distally on the vehicle.

An embodiment of the present invention will be described below in detail with reference to the accompanying drawings. The same or equivalent elements will be denoted by the same reference numerals and the description thereof will not be repeated. A description is given of a case where a bumper beam according to the present embodiment is applied to a front bumper of an automobile, as an example.

FIG. 1 is a cross-sectional view of a bumper beam according to the present embodiment. FIG. 1 illustrates a cross section perpendicular to a lengthwise direction of the bumper beam. Referring to FIG. 1, a bumper beam 1 is disposed inside a bumper 10 of a vehicle. The bumper beam 1 includes a first member 2 and a second member 3. The bumper beam 1 has a cross section shape illustrated in FIG. 1, extending in the vehicle width direction.

[First Member]

The first member 2 includes a first top panel part 5, two first vertical wall parts 6a and 6b, and two first flange parts 7a and 7b. The first top panel part 5 is flat with respect to a cross section of the bumper beam 1 perpendicular to the lengthwise direction. The first top panel part 5 being flat does not herein mean only the first top panel part 5 being strictly flat and including neither unevenness nor bendings. Being flat herein includes a case where, in a cross section of the bumper beam 1 perpendicular to the lengthwise direction, an entire of the first top panel part 5 lies on a side opposite to the second member 3 of a line that connects a midpoint of one first vertical wall part 6a in the vehicle length direction and a midpoint of another first vertical wall part 6b in the vehicle length direction (rearward in the vehicle length direction).

When the bumper beam 1 deforms by a load exerted from the second member 3 to toward the first member 2, a tensile force is generated in the first top panel part 5 in the lengthwise direction. The tensile force generated in the first top panel part 5 depends on a cross-sectional area of the first top panel part 5 and a tensile stress that is generated in the first top panel part 5. In Patent Literature 4, a cross-sectional area of a first top panel part 5 of the bumper beam is small (see FIG. 15), which will be described in detail in Example 7. Therefore, in Patent Literature 4, the tensile force generated in the first top panel part 5 is weak. Assuming that a plate thickness is the same in Patent Literature 4 and the present embodiment, a mass of the bumper beam of Patent Literature 4 is heavier than that of the bumper beam of the present embodiment by a protruding part 40 of the first top panel part 5 (see FIG. 15). Accordingly, in a configuration of the bumper beam of Patent Literature 4, it is difficult to increase a maximum allowable load per unit mass. In contrast, since the first top panel part 5 of the bumper beam 1 according to the present embodiment is flat, it is possible to increase the maximum allowable load per unit mass.

The two first vertical wall parts 6a and 6b include one ends that are connected to opposite sides 5a and 5b of the first top panel part 5, respectively. The two first vertical wall parts 6a and 6b include other ends that connect to the first flange parts 7a and 7b, respectively. A cross-sectional shape of the first member 2 is an open cross-section in a hat shape. In other words, the first member 2 is opened between the two flange parts 7a and 7b. The first member 2 is made by, for example, performing press forming on a metal plate. The first member 2 is not limited to this and may be made of another starting material. For example, the first member 2 may be made of a starting material other than metal, such as CFRP.

[Second Member]

The second member 3 includes a second top panel part 4, two second vertical wall parts 8a and 8b, and two second flange parts 9a and 9b. The second top panel part 4 includes a protruding part 20 that protrudes toward a side opposite to the first top panel part 5. The two second vertical wall parts 8a and 8b are connected to opposite sides 4a and 4b of the second top panel part 4, respectively. When the bumper beam 1 is formed of the first member 2 and the second member 3, an arrangement is as follows. The second vertical wall parts 8a and 8b are disposed such as to face the first vertical wall parts 6a and 6b, respectively. The second vertical wall parts 8a and 8b are close to the first vertical wall parts 6a and 6b, respectively. There may be gaps d between the second vertical wall parts 8a and 8b and the first vertical wall parts 6a and 6b, respectively. The second vertical wall parts 8a and 8b are disposed inside the first member 2. In other words, the second vertical wall parts 8a and 8b are disposed between the first vertical wall parts 6a and 6b.

There are two second flange parts 9a and 9b that connect to the second vertical wall parts 8a and 8b, respectively. Between the second member 3 and the first member 2, joints 51 are provided. Specifically, the second flange parts 9a and 9b are joined to the first flange parts 7a and 7b, respectively. The second member 3 connects to the first flange parts 7a and 7b. In other words, the first member 2 and the second member 3 joined together form a closed cross section. The second member 3 is made by, for example, performing press forming on a metal plate. The second member 3 is not limited to this and may be made of another starting material. For example, the second member 3 may be made of a starting material other than metal, such as CFRP.

Such a bumper beam 1 is disposed such that the second member 3 lies distally on the vehicle. The disposition of the second member 3 of the bumper beam 1 that lies distally on the vehicle refers to the orientation of the second member 3 indicating how it is disposed. It does not mean that the second member 3 of the bumper beam 1 is exposed to an outside of the vehicle. For example, when the bumper beam 1 is applied as a bumper beam of a front bumper of a vehicle, the second member 3 is disposed such that the second member 3 lies on a front side of the vehicle. In this case, the first member 2 is disposed such that the first member 2 lies on a rear side of the vehicle. As the bumper beam 1 is mounted on a vehicle, perpendicular lines of the first top panel part 5 of the first member 2 and the second top panel part 4 of the second member 3 extend substantially along the vehicle length direction. Perpendicular lines of the first vertical wall parts 6a and 6b of the first member 2 extend substantially along the vehicle height direction, respectively. This makes the bumper beam 1 have a high energy absorption efficiency to a collision in the vehicle length direction. Here, the energy absorption efficiency is a value obtained by dividing an energy absorbed by a bumper beam to which a collision load is imposed by a mass of the bumper beam. In other words, a bumper beam having a high energy absorption efficiency is lightweight and high in strength. This regard will be described below in detail.

[Effect Depending on Where Second Member Lies]

Figure 2:
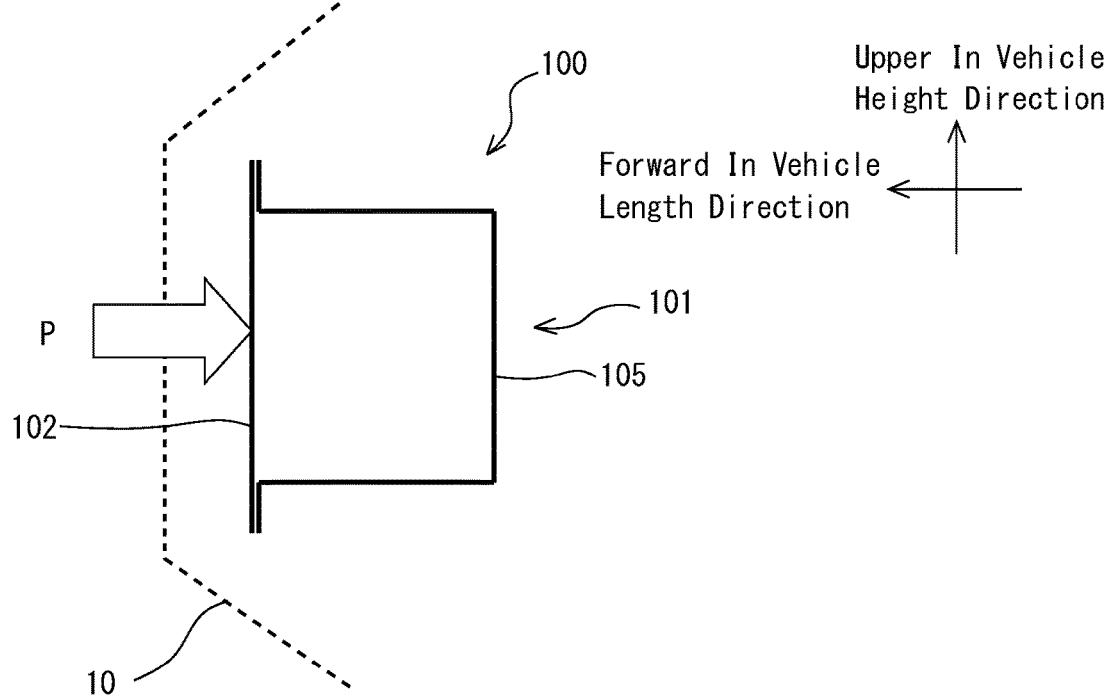
FIG. 2 is a cross-sectional view of a bumper beam in a case 1.
Figure 3:
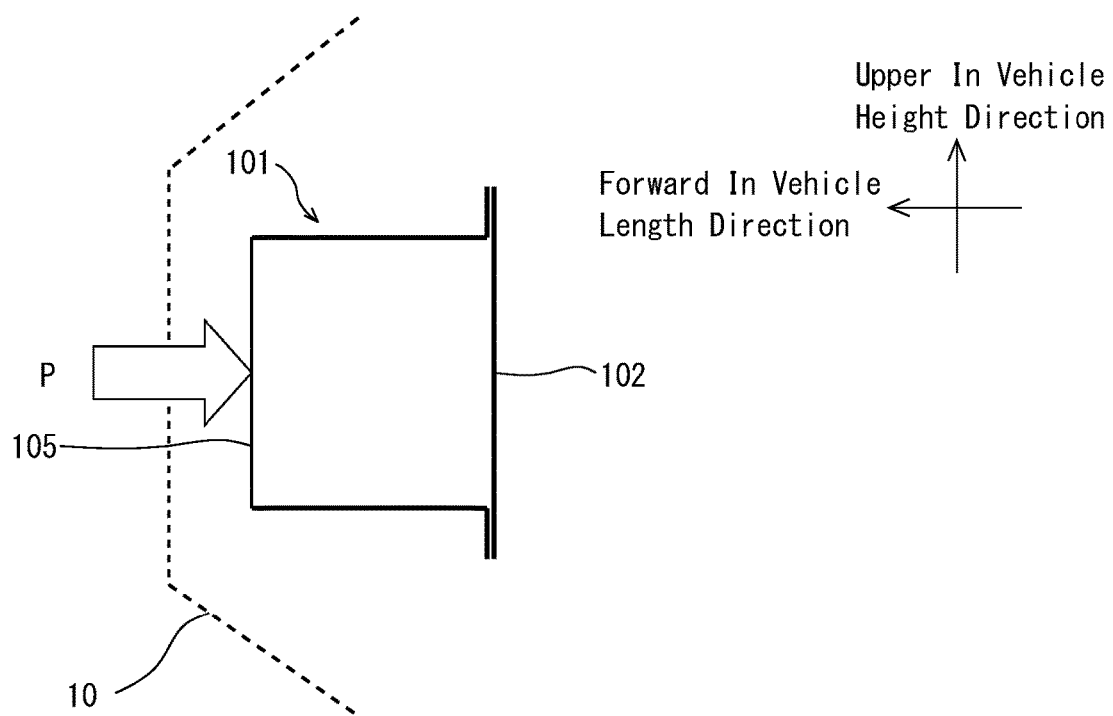
FIG. 3 is a cross-sectional view of a bumper beam in a case 2.

FIG. 2 and FIG. 3 are cross-sectional views of a typical bumper beam, which includes no reinforcing member. As illustrated in FIG. 2, a second member 102 of a bumper beam 100 is a member having a simply flat shape. In other words, the second member 102 does not include the second vertical wall parts 8a and 8b (hereafter, collectively referred to as second vertical wall parts 8) and the second top panel part 4, unlike the second member 3 according to the present embodiment illustrated in FIG. 1.

There are two ways to dispose the bumper beam on a vehicle. First one is to dispose the bumper beam such that the second member 102 lies distally on the vehicle as illustrated in FIG. 2 (hereafter, referred to as a case 1). Second one is to dispose the bumper beam such that a first member 101 lies distally on the vehicle as illustrated in FIG. 3 (hereafter, referred to as a case 2). In order to understand basic characteristics of the bumper beam, the present inventors investigated an energy absorption efficiency through a dynamic three-point bending simulation in the case 1 and the case 2.

In the case 1, a load P in a direction toward a top panel part 105 was imposed on a lengthwise-direction center of the second member 102 across the second member 102 in the vehicle height direction. In the case 2, a load P in a direction toward the second member 102 was imposed on a lengthwise-direction center of the top panel part 105 across the top panel part 105 in the vehicle height direction. Then, deformation behaviors of the bumper beams were investigated. At this point, a correlation between the load P and deflection was examined for each of the bumper beams. Here, the deflection refers to a deflection of a portion on which the load P was imposed. In the dynamic three-point bending simulation, a load imposing speed was set at 9 km/h, and an inter-fulcrum distance was set at 800 mm. Results of the simulation are illustrated in FIG. 4 to FIG. 7.

FIG. 4 to FIG. 6 are diagrams illustrating deformation behaviors of the bumper beam in the case 1. Deformation of the bumper beam proceeds in an order illustrated in FIG. 4, FIG. 5, and FIG. 6. Referring to FIG. 4 to FIG. 6, when the load P was imposed on the second member 102, compressive forces act in proximities to end portions X of vertical wall parts 106 along the lengthwise direction of the bumper beam (the vehicle width direction). Here, the compressive forces refer to forces that tend to make each of the two vertical wall parts 106 contract in the lengthwise direction of the bumper beam. The action of the compressive forces causes the end portions X of the vertical wall parts 106 on the second member 102 side to move toward a center in the vehicle height direction. As a result, the vertical wall parts 106 deform and finally buckle. When the vertical wall parts 106 buckle, a height of the bumper beam is significantly reduced as viewed in a cross section perpendicular to the lengthwise direction.

Figure 7:
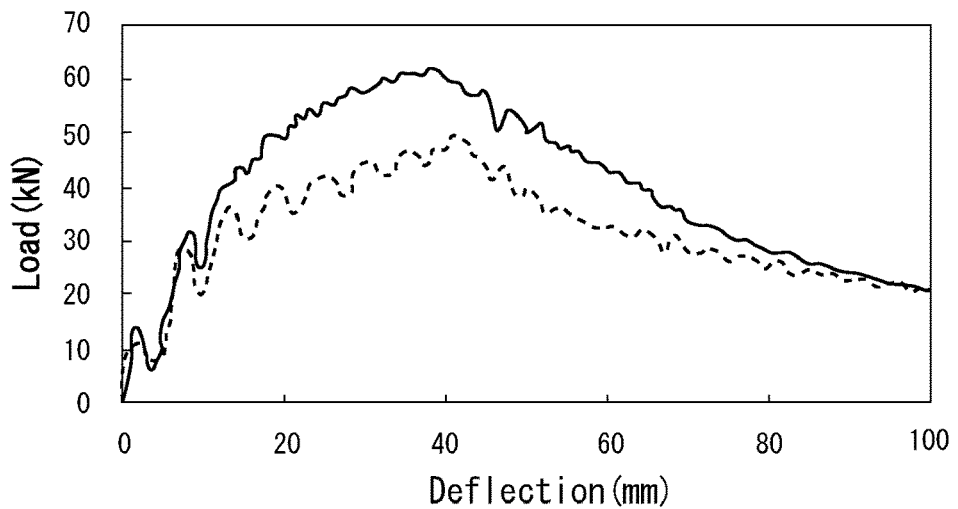
FIG. 7 is a load-deflection diagram of the case 1 and the case 2.

FIG. 7 is a load-deflection diagram about the bumper beams in the case 1 and the case 2. An ordinate indicates the load, and an abscissa indicates the deflection. In FIG. 7, a solid line indicates a result of the bumper beam in the case 1, and a dashed line indicates a result of the bumper beam in the case 2. The load-deflection diagram illustrated in FIG. 7 shows the followings. In the case 1, a maximum allowable load is reached when the deflection is about 38 mm. The maximum allowable load is about 62 kN. When the deflection exceeds about 38 mm, the vertical wall parts 106 buckle. In the case 2, a maximum allowable load is reached when the deflection is about 42 mm. The maximum allowable load is about 50 kN. When the deflection exceeds about 42 mm, the vertical wall parts 106 buckle. From the above, it is understood that the maximum allowable load in the case 1 is higher than the maximum allowable load in the case 2.

In the bumper beam in the case 1, as illustrated in FIG. 4 to FIG. 6, the compressive forces acting on the vertical wall parts 106 causes the end portions X to move toward the center of the bumper beam in the vehicle height direction in an early stage, which causes the vertical wall parts 106 to deform and buckle. In other words, when the end portions X are prevented from moving, it is possible to prevent the vertical wall parts 106 from buckling in an early stage. Hence, as illustrated in FIG. 1, in the bumper beam 1 according to the present embodiment, the second vertical wall parts 8 and the second top panel part 4 of the second member 3 are disposed between the first vertical wall parts 6 of the first member 2 (inside the first member 2).

[Effect Brought by Second Vertical Wall Parts]

Referring to FIG. 1, when a collision load is imposed on the bumper beam, the bumper beam undergoes bending deformation. At this time, as described above, the end portions X of the first vertical wall parts 6 move toward the center of the bumper beam in the vehicle height direction. The bumper beam according to the present embodiment includes the second vertical wall parts 8 of the second member 3 inside the first vertical wall parts 6. The movement of the end portions X of the first vertical wall parts 6 thereby causes the edge portions X to come into contact with the second vertical wall parts 8. This prevents the end portions X of the first vertical wall parts 6 from deforming inward. As a result, the first vertical wall parts 6 are prevented from buckling, which increases the maximum allowable load of the bumper beam.

Based on Example 2 to be described later, a ratio h1/H between a height h1 of the second vertical wall parts 8 and a height H of the first vertical wall parts 6 is preferably 0.1 or more to 0.5 or less. Here, the height H of the first vertical wall parts 6 refers to a distance between the first top panel part 5 and the first flange parts 7. The height h1 of the second vertical wall parts 8 refers to a distance between the second top panel part 4 and the second flange parts 9a and 9b.

When the ratio h1/H is small, areas of the second vertical wall parts 8 with which the end portions X of the first vertical wall parts 6 and their peripheries come into contact are small. It is therefore difficult to prevent the first vertical wall parts 6 from deforming. As a result, it is difficult to increase the maximum allowable load of the bumper beam sufficiently. Accordingly, a lower limit of the ratio h1/H is preferably 0.1. More preferably, the lower limit of the ratio h1/H is 0.2.

The end portions X of the first vertical wall parts 6 are preferably configured to come into contact with areas of the second vertical wall parts 8 that are close to the second top panel part 4. This is because the end portions X of the first vertical wall parts 6 are prevented from moving toward the center (inside) of the bumper beam by reaction force of the second top panel part 4. When the ratio h1/H is large, a distance between the second top panel part 4 and the end portions X of the first vertical wall parts 6 is long. When the end portions X of the first vertical wall parts 6 come into contact with the second vertical wall parts 8, reaction forces experienced by the end portions X of the first vertical wall parts 6 from the second top panel part 4 are weak. As a result, it is difficult to prevent the first vertical wall parts 6 from deforming, which makes it difficult to increase the maximum allowable load of the bumper beam sufficiently. Accordingly, an upper limit of the ratio h1/H is preferably 0.5. More preferably, the upper limit of the ratio h1/H is 0.4.

The second vertical wall parts 8 are disposed such that second vertical wall parts 8 are close to and face the first vertical wall parts 6. There may be the gaps d between the first vertical wall parts 6 and the second vertical wall parts 8. Based on Example 3 to be described later, the gaps d are preferably 0 mm or more to 10 mm or less. When the gap d is zero, that is, when there is no gap, the maximum allowable load of the bumper beam becomes highest. On the other hand, in a case where the first member 2 and the second member 3 are produced without providing the gaps, a more strict dimensional accuracy is required for these members. In consideration of productivity, the gaps d are acceptable to a certain extent. In contrast, when the gaps d are too large, the end portions X of the first vertical wall parts 6 come into contact with the second vertical wall parts 8 after the first vertical wall parts 6 buckle. In other words, since the first vertical wall parts 6 and the second vertical wall parts 8 are too far apart, the end portions X of the first vertical wall parts 6 are not prevented from moving inward by the second vertical wall parts 8. In other words, it is difficult to increase the maximum allowable load of the bumper beam. Accordingly, an upper limit of the gaps d is preferably 10 mm. More preferably, the upper limit of the gaps d is 9 mm.

The second flange parts 9a and 9b are preferably joined to the first flange parts 7a and 7b at positions close to the first vertical wall parts 6a and 6b, respectively. During bending deformation, the second top panel part 4 receives compressive force in the lengthwise direction to undergo out-of-plane deformation in the vehicle length direction. As a result, when the second top panel part 4 undergoes the out-of-plane deformation forward in the vehicle length direction, the first vertical wall parts 6a and 6b become difficult to come into contact with the second vertical wall parts 8a and 8b, which makes it difficult to obtain an effect of preventing the first vertical wall parts 6a and 6b from deforming inward. This out-of-plane deformation of the second top panel part 4 forward in the vehicle length direction depends on a distance between the joints 51 in the vehicle height direction; the longer the distance between the joints 51, the easier the out-of-plane deformation is to occur. Hence, in order to exert a greatest possible effect of preventing the first vertical wall parts 6a and 6b from deforming toward a bumper beam center side (inward), it is preferable that the second flange parts 9a and 9b (hereafter, collectively referred to as second flange parts 9) are joined to the first flange parts 7a and 7b at positions close to the first vertical wall parts 6a and 6b, respectively. The joints 51 are desirably provided in areas on the first flange parts 7a and 7b within 15 mm of the end portions of the first vertical wall parts 6a and 6b, respectively.

[Effect of Protruding Part]

As illustrated in FIG. 1, the protruding part 20 of the second top panel part 3 includes a flat portion 21 and wall portions 22a and 22b. FIG. 1 illustrates a case where the wall portions 22a and 22b are parallel to the second vertical wall parts 8. The wall portions 22a and 22b are however not necessarily parallel to the second vertical wall parts 8. The protruding part 20 protrudes toward a side opposite to the first top panel part 5 of the first member 2. In other words, when the bumper beam 1 is mounted on a vehicle, the protruding part 20 protrudes outward from the vehicle.

Figure 8:
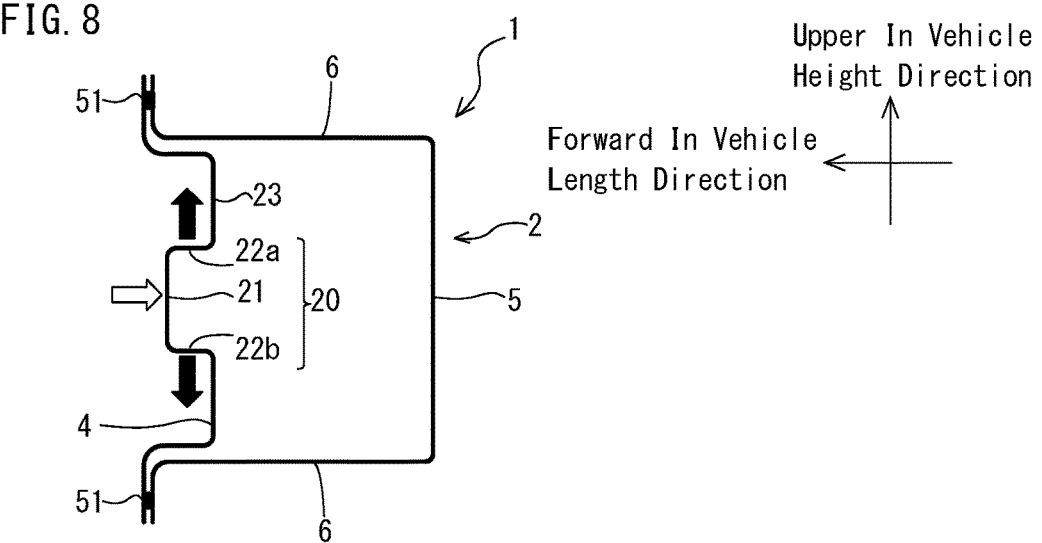
FIG. 8 is a diagram schematically illustrating a deformation behavior of the bumper beam.

FIG. 8 is a diagram schematically illustrating a deformation behavior of the bumper beam. When a collision load is imposed on the bumper beam, the flat portion 21 of the protruding part 20 deforms in a direction heading rearward in the vehicle length direction (see a solid-white arrow in FIG. 8). At this point, across a center of the bumper beam in the vehicle height direction, the wall portion 22a lying on a vehicle upper side deforms upward in the vehicle height direction, and the wall portion 22b lying on a vehicle lower side deforms downward in the vehicle height direction (see solid arrows in FIG. 8). This causes areas of the second top panel part 4 except the protruding part 20 (bottom faces 23 of the second top panel part 4) to deform to move toward the first vertical wall parts 6. As a result, the first vertical wall parts 6 are prevented from deforming inward of the bumper beam. This prevents the first vertical wall parts 6 from buckling, which further increases the maximum allowable load of the bumper beam.

Based on Example 4 to be described later, a ratio w1/W between a width w1 of the protruding part 20 and a width W of the first top panel part 5 illustrated in FIG. 1 is preferably 0.1 or more to 0.7 or less. Here, the width W of the first top panel part 5 refers to a distance between the first vertical wall parts 6. The width w1 of the protruding part 20 refers to a distance between the wall portions 22a and 22b of the protruding part 20. In a case where the wall portions 22a and 22b are not parallel to the second vertical wall parts 8, the width w1 of the protruding part 20 refers to a distance between end portions of the wall portions 22a and 22b that lie on an opposite side of the flat portion 21 (i.e., on an opening portion side of the protruding part 20).

A small ratio w1/W means that a width of the bottom faces 23 of the second top panel part 4 in the vehicle height direction is larger than the width of the protruding part 20 in the vehicle height direction. When the ratio w1/W is too small, the bottom faces 23 of the second top panel part 4 easily deflect, and it is difficult to sufficiently prevent the first vertical wall parts 6 from buckling. Accordingly, a lower limit of the ratio w1/W is preferably 0.1. More preferably, the lower limit of the ratio w1/W is 0.2.

When the ratio w1/W is too large, the width of the protruding part 20 in the vehicle height direction is large, which makes it easy for the flat portion 21 of the protruding part 20 to deflect in a collision load direction, and it is difficult to sufficiently prevent the first vertical wall parts 6 from buckling. Accordingly, an upper limit of the ratio w1/W is preferably 0.7. More preferably, the upper limit of the ratio w1/W is 0.6.

Based on Example 6 to be described later, a ratio h2/h1 between a height h2 of the protruding part 20 and the height h1 of the second vertical wall parts 8 of the second member 3 illustrated in FIG. 1 is preferably 0.5 or more to 1.1 or less. Here, the height h2 of the protruding part 20 refers to a distance between the flat portion 21 of the protruding part 20 and the bottom faces 23 of the second top panel part 4.

When the ratio h2/h1 is small, the height of the protruding part 20 is low, and the wall portions 22a and 22b of the protruding part 20 are difficult to deform. As a result, the protruding part 20 is difficult to deform even when the collision load is imposed on the bumper beam, and it is difficult to prevent the first vertical wall parts 16 from deforming. Accordingly, a lower limit of the ratio h2/h1 is preferably 0.5. More preferably, the lower limit of the ratio h2/h1 is 0.6.

In a case where the ratio h2/h1 is 1.0, the protruding part 20 starts to deform at a very early stage of the collision, which is the most desirable case. In addition, a ratio h2/h1 more than 1.0 to some extent is tolerable. When the ratio h2/h1 is more than 1.0, the protruding part 20 starts to deform before a main body of the bumper beam collides. A ratio h2/h1 more than 1.0 is particularly recommended when there are gaps between the first vertical wall parts 6 and the second vertical wall parts 8. This is because the second vertical wall parts 8 approach the first vertical wall parts 6 when the main body of the bumper beam collides. An amount by which the ratio h2/h1 is more than 1.0 may be determined according to a size of the gaps between the first vertical wall parts 6 and the second vertical wall parts 8. For example, an upper limit of the ratio h2/h1 of 1.1 is tolerable.

Now, the first flange parts 7 and the second flange parts 9 (see FIG. 1) are joined by welding, for example. Examples of a method for the welding include spot welding, plug welding, arc welding, laser welding, and the like. However, the first flange parts 7 and the second flange parts 9 may not be joined only by welding. The first flange parts 7 and the second flange parts 9 may be joined by mechanical fasteners. Examples of the mechanical fasteners include rivets, bolts and nuts, screws, and the like. In addition, the first flange parts 7 and the second flange parts 9 may be joined by adhesive. Moreover, the first flange parts 7 and the second flange parts may be joined by using welding, mechanical fasteners and adhesive in combination.

Figure 9:
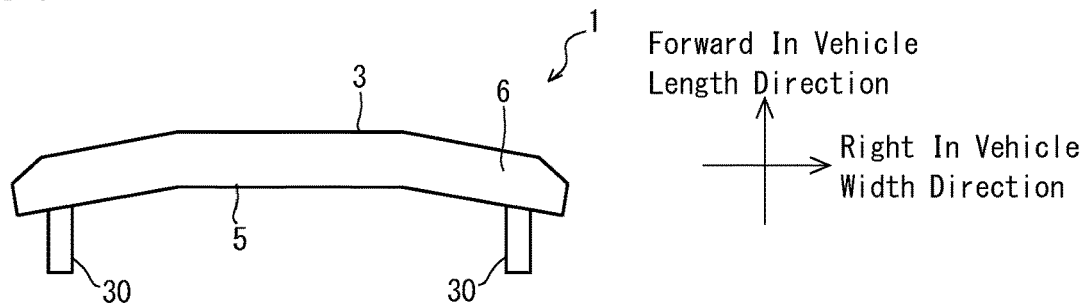
FIG. 9 is a plan view of the bumper beam.

As described above, the bumper beam according to the present embodiment is disposed such that the second member 3 lies distally on the vehicle. For example, as illustrated in FIG. 9, the bumper beam 1 bends in the lengthwise direction. In this case, an outside arc of the bending bumper beam 1 (on a second member 3 side in FIG. 9) is disposed such that the arc protrudes outward from the vehicle. The bumper beam 1 is mounted on a crush box, front side members 30, or the like disposed proximally on the vehicle. The bumper beam 1 is therefore provided with mounting holes or the like on its face lying proximally on the vehicle (e.g., the first top panel part 5). Essentially, even being unmounted, the bumper beam 1 allows for determination as to which of the first member 2 and the second member 3 of the bumper beam 1 is to lie distally on the vehicle when disposed.

The embodiment described above is given of a case where the bumper beam is made of metal plates. Examples of the metal plates include steel plates, aluminum plates, titanium plates, magnesium plates, copper plates, or nickel plates, or alloy plates, multi-layered metal plates, or the like of these metals. Since the present disclosure relates to a shape of the bumper beam, starting materials other than metals, such as CFRP, may be used as long as the starting materials satisfy the strength necessary for the bumper beam.

In a case where the bumper beam according to the present embodiment is applied to an automobile, it is preferable that the first member and the second member are made of steel plates having a tensile strength of 1 GPa or more. In this case, it is possible to further increase the strength of the bumper beam without increasing the mass of the bumper beam, further increase a safety of an automobile body and to achieve a weight reduction of the automobile body.

The embodiment described above is given of a case where the bumper beam is provided in the front portion of the vehicle. In other words, a case where the bumper beam according to the present embodiment is applied as a bumper beam of a front bumper of an automobile is described. The bumper beam according to the present embodiment is however not limited to the bumper beam of the front bumper. The bumper beam of the present embodiment may be disposed in the rear portion of the vehicle. In other words, the bumper beam of the present embodiment is applicable to a rear bumper and the like. In both of the cases, the second member of the bumper beam is disposed such that the second member lies distally on the vehicle.

Example 1

A load imposing simulation was conducted on bumper beams including second members with different shapes, and their maximum allowable loads and energy absorption efficiencies were examined.

Figure 10:
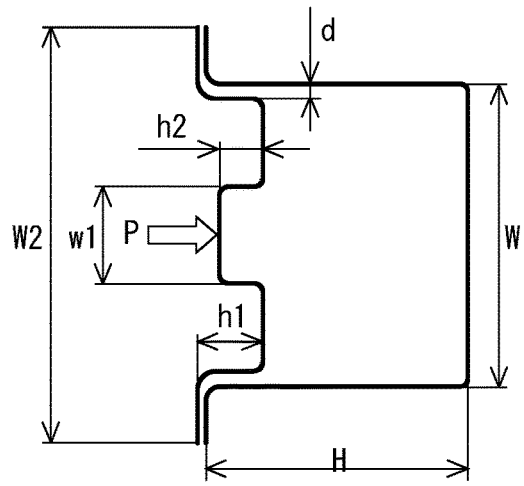
FIG. 10 is a diagram illustrating a bumper beam in Inventive Example 1 of the present invention.
Figure 11:
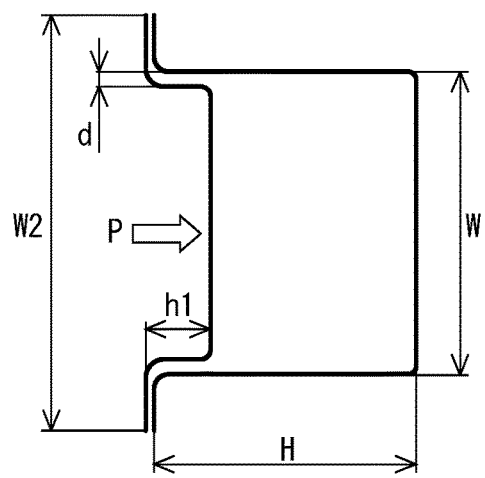
FIG. 11 is a diagram illustrating a bumper beam in Reference Example.
Figure 12:
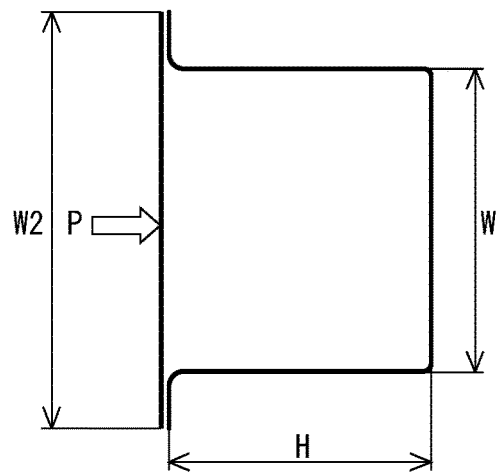
FIG. 12 is a diagram illustrating a bumper beam in Comparative Example 1.

FIG. 10 to FIG. 12 illustrate models of the bumper beams used for studies in Example 1. FIG. 10 illustrates the bumper beam in Inventive Example 1 of the present invention. FIG. 11 illustrates a bumper beam in Reference Example. FIG. 12 illustrates a bumper beam in Comparative Example 1. As to dimensions of these bumper beams, the height H of the vertical wall parts of the first member was set at 60 mm, the width W of the first top panel part was set at 80 mm, and the width W2 of the second member was set at 120 mm. In Inventive Example 1 of the present invention and Reference Example, the gaps d between the first vertical wall parts and the second vertical wall parts were set at 0 mm, and the height $h_1$ of the second vertical wall parts was set at 15 mm. In Inventive Example 1 of the present invention, the height $h_2$ of the protruding part was set at 15 mm, and the width $w_1$ of the protruding part was set at 30 mm. In Inventive Example 1 of the present invention, Reference Example, and Comparative Example 1, the load P was imposed on the center of the second member toward the first member. The first member and the second member were supposed to be steel plates having a tensile strength of 1310 MPa and a plate thickness of 1.4 mm. As to the joint, spot welding was modeled, in which spot welds were provided in areas on the first flange parts 7a and 7b 10 mm from the end portions of the first vertical wall parts 6a and 6b side. A diameter of the spot welds was set at 4.7 mm, and pitches between centers of the spot welds were set at 30 mm.

Figure 13:
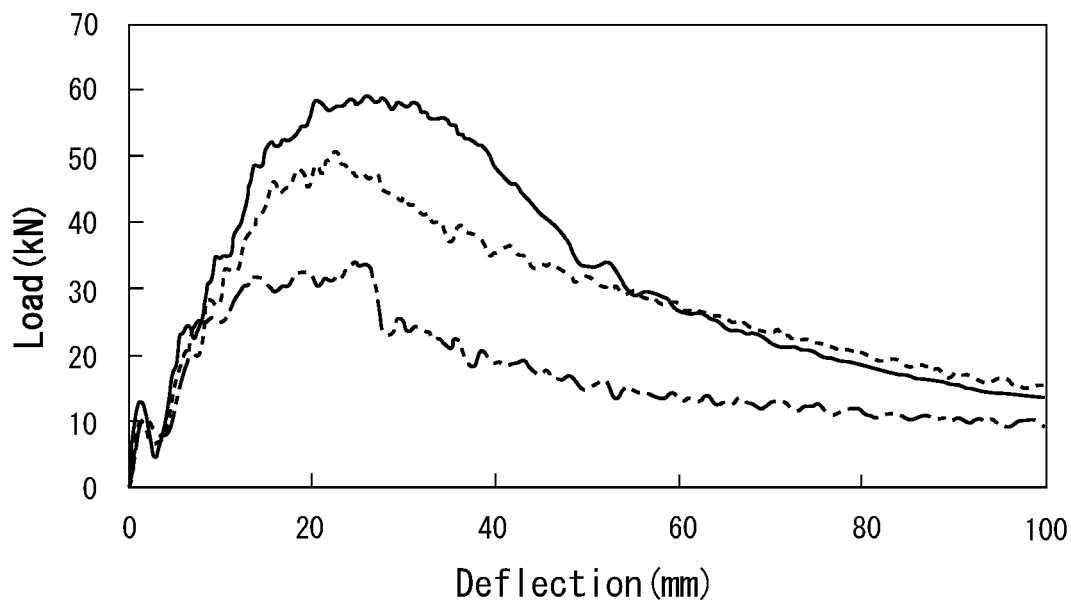
FIG. 13 illustrates load-deflection curves of the bumper beams in Example 1.

FIG. 13 illustrates load-deflection curves of the bumper beams in Example 1. In FIG. 13, a solid line illustrates a result of Inventive Example 1 of the present invention, a broken line illustrates a result of Reference Example, and a dashed line illustrates a result of Comparative Example 1. As illustrated in FIG. 13, a maximum allowable load of the Inventive Example 1 of the present invention was 59.2 kN. A maximum allowable load of Reference Example was 51.5 kN. A maximum allowable load of Comparative Example 1 was 34.1 kN.

Based on simulation results of Example 1, maximum allowable loads per unit mass of the bumper beams and energy absorption efficiencies of the bumper beams with their deflections reaching up to 60 mm were calculated. Results of the calculation are shown in Table 1. The energy absorption efficiencies were calculated based on energies that made their deflections reach 60 mm.

TABLE 1

| | MAXIMUM ALLOWABLE LOAD (kN) | MAXIMUM ALLOWABLE LOAD PER UNIT MASS (kN/kg) | ENERGY ABSORPTION EFFICIENCY (kJ/kg) |
| --- | --- | --- | --- |
| Inventive Example 1 of the present invention | 59.2 | 14.0 | 0.59 |
| Reference Example | 51.5 | 12.8 | 0.51 |
| Comparative Example 1 | 34.1 | 9.0 | 0.34 |

As illustrated in Table 1, the maximum allowable load of the Inventive Example 1 of the present invention was higher than the maximum allowable load of Comparative Example 1. In addition, the energy absorption efficiency of Inventive Example 1 of the present invention was higher than the energy absorption efficiency of Comparative Example 1.

Example 2

In Example 2, by means of the model of Inventive Example of the present invention illustrated in FIG. 10, as in Example 1, maximum allowable loads were examined with the height $h_1$ of the second vertical wall parts changed variously. The simulation was conducted with three values of the ratio $h_1/H$ between the height $h_1$ of the second vertical wall parts and the height H of the first member: $h_1/H=0.17$, 0.25, and 0.50. Results of the determination are shown in Table 2.

TABLE 2

| h1/H | MASS (kg) | MAXIMUM ALLOWABLE LOAD (kN) | MAXIMUM ALLOWABLE LOAD PER UNIT MASS (kN/kg) |
|---|---|---|---|
| 0.17 | 4.1 | 58 | 14.2 |
| 0.25 | 4.3 | 59.8 | 14.0 |
| 0.50 | 4.9 | 57.7 | 11.7 |

As shown in Table 2, the maximum allowable loads of the bumper beams used in Example 2 were all higher than the maximum allowable load 34.1 kN of the bumper beam in Comparative Example 1 shown in Table 1. In addition, the maximum allowable loads per unit mass of the bumper beam used in Example 2 were all higher than the maximum allowable loads per unit mass 9.0 kN/kg of the bumper beam in Comparative Example 1 shown in Table 1.

Example 3

In Example 3, by means of the model of Inventive Example of the present invention illustrated in FIG. 10, as in Example 1, maximum allowable loads were examined with the gaps d between the first vertical wall parts and the second vertical wall parts changed variously. The simulation was conducted with two values of the gaps d=0, 5 and 10 mm. Results of the determination are shown in Table 3.

TABLE 3

| d | MAXIMUM ALLOWABLE LOAD (kN) |
|---|---|
| 0 | 59.8 |
| 5 | 55.9 |
| 10 | 48.6 |

As shown in Table 3, the maximum allowable loads of the bumper beams used in Example 3 were all higher than the maximum allowable load 34.1 kN of the bumper beam in Comparative Example 1 shown in Table 1.

Example 4

In Example 4, by means of the model of Inventive Example of the present invention illustrated in FIG. 10, as in Example 1, maximum allowable loads were examined with the width w1 of the protruding part of the second member changed variously. The simulation was conducted with three values of the ratio w1/W between the width w1 of the protruding part and the width W of the first top panel part: w1/W=0.59, 0.41, and 0.19. Results of the determination are shown in Table 4.

TABLE 4

| w1/W | MASS (kg) | MAXIMUM ALLOWABLE LOAD (kN) | MAXIMUM ALLOWABLE LOAD PER UNIT MASS (kN/kg) |
|---|---|---|---|
| 0.59 | 4.26 | 59.8 | 14.0 |
| 0.41 | 4.23 | 59.2 | 14.0 |
| 0.19 | 4.26 | 59.3 | 13.9 |

As shown in Table 4, the maximum allowable loads of the bumper beams used in Example 4 were all higher than the maximum allowable load 34.1 kN of the bumper beam in Comparative Example 1 shown in Table 1. In addition, the maximum allowable loads per unit mass of the bumper beam used in Example 4 were all higher than the maximum allowable loads per unit mass 9.0 kN/kg of the bumper beam in Comparative Example 1 shown in Table 1.

Example 5

Figure 14:
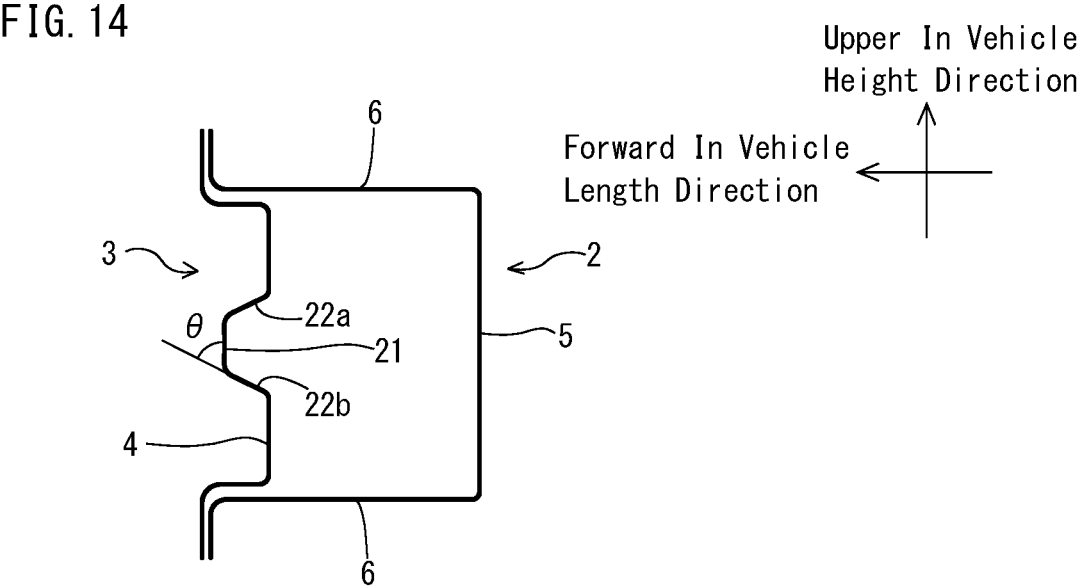
FIG. 14 is a diagram illustrating an angle of a protruding part of a bumper beam in Example 5.

In Example 5, by means of the model of Inventive Example of the present invention illustrated in FIG. 10, as in Example 1, maximum allowable loads were examined with an angle θ of the protruding part of the second member changed variously. Here, the angle θ of the protruding part refers to acute one of angles formed between the flat portion 21 of the protruding part and the wall portions 22a and 22b of the protruding part (see FIG. 14). The simulation was conducted with three values of the angle θ=90, 60, and 45°. Results of the determination are shown in Table 5.

TABLE 5

| θ (°) | MASS (kg) | MAXIMUM ALLOWABLE LOAD (kN) |
|---|---|---|
| 90 | 4.22 | 59.2 |
| 60 | 4.17 | 59.8 |
| 45 | 4.13 | 59.9 |

As shown in Table 5, the maximum allowable loads of the bumper beams used in Example 5 were all higher than the maximum allowable load 34.1 kN of the bumper beam in Comparative Example 1 shown in Table 1.

Example 6

In Example 6, by means of the model of Inventive Example of the present invention illustrated in FIG. 10, as in Example 1, maximum allowable loads were examined with the height h2 of the protruding part of the second member changed variously. The simulation was conducted with two values of the ratio h2/h1 between the height h2 of the protruding part and the height h1 of the second vertical wall parts: h2/h1=0.67 and 1.0. Results of the determination are shown in Table 6.

TABLE 6

| h2/h1 | MASS (kg) | MAXIMUM ALLOWABLE LOAD (kN) | MAXIMUM ALLOWABLE LOAD PER UNIT MASS (kN/kg) |
|---|---|---|---|
| 0.67 | 4.15 | 59.6 | 14.4 |
| 1.0 | 4.26 | 59.8 | 14.0 |

As shown in Table 6, the maximum allowable loads of the bumper beams used in Example 6 were all higher than the maximum allowable load 34.1 kN of the bumper beam in Comparative Example 1 shown in Table 1. In addition, the maximum allowable loads per unit mass of the bumper beam used in Example 6 were all higher than the maximum allowable loads per unit mass 9.0 kN/kg of the bumper beam in Comparative Example 1 shown in Table 1. When the gaps d between the first vertical wall parts and the second vertical wall parts are more than zero, a ratio h2/h1 more than 1.0 to some extent is tolerable. From the results of Example 3, the closer the gaps d come to zero, the more advantageous it is. In a case where the gaps d are more than zero, when the ratio h2/h1 is more than 1.0, the second vertical wall parts 8 approaches the first vertical wall parts 6 when the main body of the bumper beam collides, which is advantageous. For example, an upper limit of the ratio h2/h1 of 1.1 is tolerable.

Example 7

In Example 7, maximum allowable loads and maximum allowable loads per unit mass were compared between the model of Inventive Example of the present invention illustrated in FIG. 10, as in Example 1, and a model of Comparative Example having the same shape as that of the bumper beam described in Patent Literature 4. In Example 7, the simulation was conducted with two values of the height H of the first vertical wall parts: H=40 and 60 mm.

Figure 15:
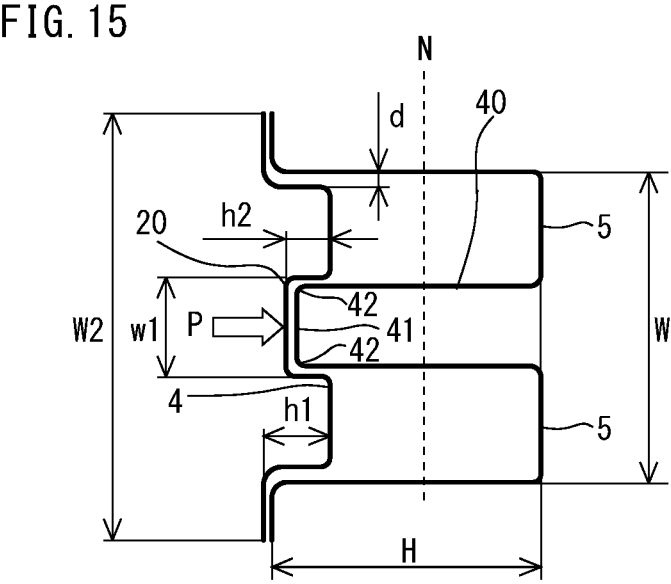
FIG. 15 is a diagram illustrating bumper beams in Comparative Examples 2 to 5.

FIG. 15 is a diagram illustrating bumper beams of Comparative Examples 2 to 5. As illustrated in FIG. 15, a first top panel part 5 of the bumper beams of Comparative Examples 2 to 5 includes a protruding part 40 that protrudes toward a second member 3 side. In bumper beams of Comparative Examples 2 and 3, the protruding part 40 of the first top panel part 5 was joined to a protruding part 20 of a second top panel part 4. In bumper beams of Comparative Examples 4 and 5, the protruding part 40 of the first top panel part 5 was not joined to the protruding part 20 of the second top panel part 4. In Example 7, tensile strengths of all models of Inventive Examples of the present invention and Comparative Examples are assumed to be 980 MPa. In Inventive Example 2 of the present invention, Comparative Example 2, and Comparative Example 4, the masses of their bumper beams were equalized as much as possible by changing plate thicknesses of the models. In Inventive Example 3 of the present invention, Comparative Example 3, and Comparative Example 5, the masses of their bumper beams were equalized in the same manner. Results of Example 7 are shown in Table 7.

the bumper beam in Inventive Example 3 of the present invention. It is inferred that this is due to the following reasons.

Referring to FIG. 15, when the bumper beam deforms, the first top panel part 5 is expanded in the lengthwise direction. In other words, a tensile force occurs in the first top panel part 5 in the lengthwise direction. Tensile stresses occurring all over the first top panel part 5 depends on distances from a neutral plane N that is developed when the bumper beam is bent. This is because, an amount of deformation increases at a longer distance from the neutral plane N of the bending of the bumper beam toward the first top panel part 5 side, and a tensile stress increases accordingly. The neutral plane N of the bending of the bumper beam lies at a same position as a plane that is substantially defined by a line connecting midpoints of the first vertical wall parts 6. The neutral plane N does not coincide with the plane completely because the position of the neutral plane N can fluctuate to some extent under a condition that a plate thickness of a plate material forming the bumper beam is nonuniform, or other conditions.

The first top panel part 5 of the bumper beam of Patent Literature 4 includes the protruding part 40 that extends inward of the bumper beam. As the protruding part 40 becomes large, a cross-sectional area of the protruding part 40 increases. In other words, a mass of the bumper beam increases. Meanwhile, in the protruding part 40, a tensile stress occurring at a position becomes smaller as the position lies closer to the neutral plane N. A tensile stress occurring in a member can be determined by integrates the tensile stress with respect to a cross-sectional area of the member. When a collision load is imposed on the bumper beam, the first top panel part 5 is where a highest tensile stress occurs. The bumper beam of Patent Literature 4 includes the first top panel part 5 that is smaller by the protruding part 40. In other words, the bumper beam of Patent Literature 4 has a small area where the highest tensile stress of the bumper beam occurs. In addition, the bumper beam of the Patent Literature 4 has a spot where a low tensile stress occurs when the

TABLE 7

|  | HEIGHT H (mm) | PLATE THICKNESS (mm) | MASS (kg) | MAXIMUM ALLOWABLE LOAD (kN) | MAXIMUM ALLOWABLE LOAD PER UNIT MASS (kN/kg) |
|---|---|---|---|---|---|
| Inventive Example 2 of the present invention | 40 | 1.4 | 4.33 | 22.4 | 5.17 |
| Inventive Example 3 of the present invention | 60 | 1.5 | 5.20 | 42.7 | 8.21 |
| Comparative Example 2 | 40 | 1.2 | 4.55 | 23.2 | 5.10 |
| Comparative Example 3 | 60 | 1.2 | 5.45 | 42.4 | 7.78 |
| Comparative Example 4 | 40 | 1.2 | 4.55 | 22.3 | 4.55 |
| Comparative Example 5 | 60 | 1.2 | 5.45 | 37.7 | 6.92 |

As shown in Table 7, the maximum allowable load per unit mass of the bumper beam in Inventive Example 2 of the present invention was higher than the maximum allowable loads per unit mass of the bumper beams in Comparative Examples 2 and 4, which had the same height H as that of the bumper beam in Inventive Example 2 of the present invention. Similarly, the maximum allowable load per unit mass of the bumper beam in Inventive Example 3 of the present invention was higher than the maximum allowable loads per unit mass of the bumper beams in Comparative Examples 3 and 5, which had the same height H as that of bumper beam deforms (the protruding part 40). A maximum allowable load per unit mass of the bumper beam of the Patent Literature 4 is smaller than that of the present embodiment. Conversely, spots of the protruding part 40 on a protruding side of the neutral plane N of the bending of the bumper beam undergoes compressive deformation. In this case, a flat portion 41 of the protruding part 40 undergoes out-of-plane deformation, and therefore compressive stresses occur only in ridge portions 42 of the protruding part 40. In other words, areas where the compressive stresses occur are small, and a compressive force occurring in the protruding part 40 is small. As a result, the spots of the protruding part 40 on the protruding side of the neutral plane N of the bending of the bumper beam are difficult to contribute to an increase in the maximum allowable load.

Therefore, although the bumper beam according to the present embodiment may include the protruding part in the first top panel part 5, and the protruding part extends inward the bumper beam, the bumper beam does not extend beyond the neutral plane N of the bending of the bumper beam. The neutral plane N of the bending of the bumper beam is substantially formed of a line that connects a midpoint of one first vertical wall part 6a in the vehicle length direction and a midpoint of another first vertical wall part 6b in the vehicle length direction (see FIG. 1). It is more desirable that, even with the protruding part extending inward of the bumper beam, the protruding part of the first top panel part 5 does not come in contact with a line that connects one of five equal points of the one first vertical wall part 6a in the vehicle length direction, the one lying closest to the first top panel part 5, and one of five equal points of the other first vertical wall part 6b in the vehicle length direction, the one lying closest to the first top panel part 5.

Essentially, the maximum allowable loads per unit mass of the bumper beams in Inventive Examples of the present invention is larger than the maximum allowable loads per unit mass of the bumper beams in Comparative Examples because the bumper beams in Comparative Examples each had a heavy mass, included the first top panel part in which areas of portions where tensile forces occur are large, and the bumper beams in Inventive Examples of the present invention each had a light mass.

The embodiment according to the present invention has been described above. However, the aforementioned embodiment is merely an example for practicing the present invention. Therefore, the present invention is not limited to the aforementioned embodiment, and the aforementioned embodiment can be modified and implemented as appropriate without departing from the scope of the present invention.

REFERENCE SIGNS LIST 1 bumper beam
2 first member
3 second member
4 second top panel part
5 first top panel part
6 first vertical wall part
7 first flange part
8 second vertical wall part
9 second flange part
10 bumper
20 protruding part
21 flat portion of protruding part
22a, 22b wall portion of protruding part
d gap between first vertical wall part and second vertical wall part
H height of first vertical wall part
h1 height of second vertical wall part
h2 height of protruding part
W width of first top panel part
w1 width of protruding part
P collision load
X end portion of first vertical wall part

The invention claimed is:

1. A bumper beam for a vehicle comprising: a first member including, in a cross section perpendicular to a lengthwise direction of the bumper beam, a first top panel part that is flat, two first vertical wall parts each connected to a respective one of opposite sides of the first top panel part and two first flange parts each connected to a respective one of the two first vertical wall parts; and a second member including, in the cross section perpendicular to the lengthwise direction, a second top panel part that includes a protruding part protruding toward a side opposite to the first top panel part, two second vertical wall parts each connected to a respective one of opposite sides of the second top panel part, the two second vertical wall parts being disposed such that the two second vertical wall parts each faces a respective one of the first vertical wall parts inside the first member, and two second flange parts that are disposed such that the second flange parts each connected to a respective one of the two second vertical wall parts and joined to a respective one of the first flange parts, wherein gaps between a respective one of the first vertical wall parts and a respective one of the second vertical wall parts are 0 mm or more to 10 mm or less.

2. The bumper beam for a vehicle according to claim 1, wherein a ratio h1/H between a height h1 of the second vertical wall parts and a height H of the first vertical wall parts is 0.1 or more to 0.5 or less.

3. The bumper beam for a vehicle according to claim 1, wherein a ratio w1/W between a width w1 of the protruding part of the second top panel part and a width W of the first top panel part is 0.1 or more to 0.7 or less, and a ratio h2/h1 between a height h2 of the protruding part of the second top panel part and the height h1 of the second vertical wall parts is 0.5 or more to 1.1 or less.

4. The bumper beam for a vehicle according to claim 1, wherein a respective one of the first flange parts and a respective one of the second flange parts are joined by welding, adhesion, rivets, or a combination thereof.

5. The bumper beam for a vehicle according to claim 1, wherein the first member and the second member are made of steel plates, and the steel plates each have a tensile strength of 1 GPa or more.

6. The bumper beam for a vehicle according to claim 1, further comprising:

a plurality of joints, each of the plurality of joints provided between a respective one of the first flange parts and a respective one of the second flange parts in an area within 15 mm of an edge of a side of one of the respective first vertical wall parts.

7. The bumper beam for a vehicle according to claim 1, wherein in the cross section perpendicular to the lengthwise direction, an entire of the first top panel part lies on an opposite side of a line that connects midpoints of the first vertical wall parts from the second member.

8. A vehicle comprising the bumper beam for a vehicle according to claim 1 in a front portion or a rear portion of the vehicle, wherein the second member of the bumper beam is disposed such that the second member lies distally on the vehicle.

9. The bumper beam for a vehicle according to claim 2, wherein a ratio w1/W between a width w1 of the protruding part of the second top panel part and a width W of the first top panel part is 0.1 or more to 0.7 or less, and a ratio h2/h1 between a height h2 of the protruding part of the second top panel part and the height h1 of the second vertical wall parts is 0.5 or more to 1.1 or less.

10. The bumper beam for a vehicle according to claim 2, wherein a respective one of the first flange parts and a respective one of the second flange parts are joined by welding, adhesion, rivets, or a combination thereof.

11. The bumper beam for a vehicle according to claim 2, wherein the first member and the second member are made of steel plates, and the steel plates each have a tensile strength of 1 GPa or more.

12. The bumper beam for a vehicle according to claim 2, further comprising:
a plurality of joints, each of the plurality of joints provided between a respective one of the first flange parts and a respective one of the second flange parts in an area within 15 mm of an edge of a side of one of the respective first vertical wall parts.

13. The bumper beam for a vehicle according to claim 2, wherein in the cross section perpendicular to the lengthwise direction, an entire of the first top panel part lies on an opposite side of a line that connects midpoints of the first vertical wall parts from the second member.

14. The bumper beam for a vehicle according to claim 3, wherein a respective one of the first flange parts and a respective one of the second flange parts are joined by welding, adhesion, rivets, or a combination thereof.

15. The bumper beam for a vehicle according to claim 3, wherein the first member and the second member are made of steel plates, and the steel plates each have a tensile strength of 1 GPa or more.

16. The bumper beam for a vehicle according to claim 3, further comprising:
a plurality of joints, each of the plurality of joints provided between a respective one of the first flange parts and a respective one of the second flange parts in an area within 15 mm of an edge of a side of one of the respective first vertical wall parts.

17. The bumper beam for a vehicle according to claim 3, wherein in the cross section perpendicular to the lengthwise direction, an entire of the first top panel part lies on an opposite side of a line that connects midpoints of the first vertical wall parts from the second member.

18. The bumper beam for a vehicle according to claim 1, wherein the first top panel part does not include a protruding part extending beyond a neutral plane N of a bending of the bumper beam.

* * * * *